(12) United States Patent
White et al.

(10) Patent No.: US 9,844,080 B2
(45) Date of Patent: Dec. 12, 2017

(54) NOTIFICATION TRIGGERED DEVICE MANAGEMENT SESSION

(71) Applicant: VERIZON PATENT AND LICENSING INC, Arlington, VA (US)

(72) Inventors: Brian Matthew White, Port Murray, NJ (US); Taral Patel, Piscataway, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 16 days.

(21) Appl. No.: 14/303,898

(22) Filed: Jun. 13, 2014

(65) Prior Publication Data
US 2015/0365820 A1 Dec. 17, 2015

(51) Int. Cl.
*H04W 76/02* (2009.01)
*H04L 29/08* (2006.01)
*H04W 4/00* (2009.01)
*H04W 8/04* (2009.01)
*H04L 29/06* (2006.01)

(52) U.S. Cl.
CPC ......... *H04W 76/02* (2013.01); *H04L 67/2861* (2013.01); *H04L 67/303* (2013.01); *H04W 76/022* (2013.01); *H04L 65/1016* (2013.01); *H04W 4/001* (2013.01); *H04W 8/04* (2013.01)

(58) Field of Classification Search
CPC .................................................. H04W 4/001
USPC ............................... 726/6; 713/100; 455/418
See application file for complete search history.

(56) References Cited

U.S. PATENT DOCUMENTS 7,215,946 B1 * 5/2007 Cardina ................. H04L 51/24
379/88.12
7,760,857 B2 * 7/2010 Vetter ................. G06F 11/0709
379/9.03
8,549,119 B1 * 10/2013 Singh ................... H04L 41/0853
709/222
8,626,143 B2 * 1/2014 Haughn ..................... G06F 8/65
455/418
2004/0225693 A1 * 11/2004 Ganji ................ G06F 17/30575
2006/0039561 A1 * 2/2006 Ypya ................... H04L 41/0253
380/270
2008/0261631 A1 * 10/2008 Nath ..................... H04L 67/125
455/466
2009/0036111 A1 * 2/2009 Danford .............. H04L 41/0893
455/419
2009/0113052 A1 * 4/2009 Doshi ................... H04W 24/08
709/225
2014/0113609 A1 * 4/2014 Elloumi ................ H04W 68/00
455/418

* cited by examiner

*Primary Examiner* — Vladimir Magloire
*Assistant Examiner* — Majid Syed (57) ABSTRACT

Systems and methods for a notification triggered device management session are described. A request for a device management session for a mobile station is received at a device management server. In response to determining that the mobile station is not connected to a cellular network, a home subscriber server is signaled to update a user equipment profile for the mobile station to indicate that the mobile station has a pending device management session. Upon connection of the mobile station to a first network, the mobile station is signaled to connect to the device management server for the device management session using a call session control function. The mobile station is connected with the device management server using the first network. The device management session is run using the first network connection between the mobile station and the device management server.

20 Claims, 8 Drawing Sheets

NOTIFICATION TRIGGERED DEVICE MANAGEMENT SESSION

BACKGROUND

Oftentimes, users of mobile stations, such as mobile phones or tablet computers, experience problems (e.g., software bugs, poor network connectivity, etc.) with their devices and contact the cellular operator for support regarding the problems. The cellular operator may provide support using a device management session, where the mobile station connects to a device management server via the cellular network. The mobile station is prompted to connect to the device management server via a wireless application protocol (WAP) push or a short messaging service (SMS) message initiated at the device management server.

However, in some cases, and especially in cases when a user is experiencing problems with his/her mobile station, the mobile station may be unable to connect to the cellular network, for instance, due to a software bug, a hardware failure, or being in a geographic location with poor cellular coverage. In these cases, the mobile station may be unable to receive the WAP push or the SMS message and, thus, may fail to connect to the device management server. As the foregoing illustrates, a new approach for connecting a mobile station with a device management server may be desirable.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The subject technology provides techniques for connecting a mobile station with a device management server for initiating a device management session for the mobile station via the device management server. A mobile station may include any device configured to connect to a cellular network, for example, a mobile phone, a tablet computer including a cellular network interface, a laptop computer including a cellular network interface, etc. According to some implementations, a device management server receives a request for a device management session for a mobile station. For example, a user of the mobile station may notify an employee of the cellular operator that the user is having problems with the mobile station, and the employee may signal the device management server to initiate the device management session to troubleshoot or provide updates or bug fixes to the mobile station. In one specific example, the user may call a customer support of the cellular operator or visit the web site of the cellular operator to inform the cellular operator of the user's problems with the mobile station. The employee receiving the call or reviewing the information entered by the user when visiting the website may then signal the device management server to initiate the device management session. Alternatively, the initiation of the device management session may be automated. For example, a user may open an application or visit a website and press a button in the application or website to initiate the device management session. The device management session may include a software update, a connectivity settings update, a cellular provider settings update, or a diagnostic session.

The device management server attempts to connect to the mobile station using a message transmitted via the cellular network, for example, a wireless application protocol (WAP) push or a short messaging service (SMS) message. If the mobile station is connected to the cellular network, the mobile station may respond by initiating the device management session with the device management server over the cellular network connection. If the device management server fails to receive, within a threshold time period (e.g., 10 seconds, 1 minute, 1 hour, etc.), a response to the message from the mobile station, the device management server may determine that the mobile station is not presently connected to the cellular network. The threshold time period may be determined based on a network speed, a processing speed of the mobile station, or a processing speed of the device management server. The threshold time period may be based on either a client configuration (e.g., of the mobile station) or a server configuration (e.g., of the device management server or the SMS Center). The server may have an automated retry mechanism or the server delivering the WAP/SMS message may have an automatic retry mechanism based on a back-off algorithm. The mobile station may not be connected to the cellular network for several reasons. The reasons may be due to problems with software or hardware of the mobile station allowing connection with the cellular network, due to the mobile station being in a geographic area with poor cellular coverage, due to the mobile station having a cellular radio turned off (e.g., being placed in airplane mode), or due to the mobile station being fully turned off.

Upon determining that the mobile station is not presently connected to the cellular network, the device management server signals a home subscriber server (HSS) to update a user equipment profile for the mobile station to indicate that the mobile station has a pending device management session. The mobile station may connect to a first network either in real-time (e.g., without any intentional delay) or a time period (e.g., 10 minutes, 1 hour, 12 hours, etc.) after the HSS updates the user equipment profile for the mobile station. The length of the time period is determined based on the activities and geographic location(s) of the user of the mobile station. For example, if the mobile station and its users are flying in an airplane, the mobile station may connect to the first network when the airplane lands. If the mobile station is in a basement of a house with no cellular coverage, the mobile station may be connected to the first network (e.g., a Wi-Fi network of the house) or may connect to the first network when the user decides to initiate the network connection. The delay may be caused, for example, due to the mobile station not being within a connectivity range of any network when the HSS updates the user equipment profile. The first network may be the cellular network, a Wi-Fi network distinct from the cellular network, or a wired network. For example, the mobile station may be located in a geographic area where there is a Wi-Fi connection but no cellular connection (e.g., a basement of a home) when the HSS updates the user equipment profile. Alternatively, the mobile station may be turned off when the HSS updates the user equipment profile and may later be turned on.

Upon connecting to the first network, the mobile station is signaled, by a call session control function (CSCF) to connect to the device management server for the device management session. The CSCF signals the mobile station to connect to the device management server for the device management session based on the user equipment profile for the mobile station indicating that the mobile station has the pending device management session. The CSCF may signal the mobile station using a session initiation protocol (SIP) message. In response to the signal, the mobile station connects to the device management server using the first network. The device management session is run using the first network connection between the cellular network and the device management server.

To this end, in some implementations of the subject technology, the number of failures experienced in initiating a device management session between the device management server and the mobile station may be reduced because the device management session may be initiated using any network connection of the mobile station, not necessarily a cellular network connection. Also, if the mobile station is not connected to any network when the device management session is requested, the device management session may remain pending until the mobile station connects to a network. If the mobile station is connected to the cellular network when the device management session is requested, an SMS message may be sent to the mobile station to automatically initiate the device management session. However, if the mobile station is connected to a network different from the cellular network, the device management server and the mobile station may communicate using an Internet Protocol (IP) connection. In some cases, the mobile station may not have cellular connectivity at all, but may register with the mobile network operator (MNO) Internet Protocol Multimedia Subsystem (IMS) network for other services, such as Voice Over Internet Protocol (VOIP) over Wi-Fi. In some cases, the mobile station may not be programmed to communicate using WAP or SMS.

Figure 1:
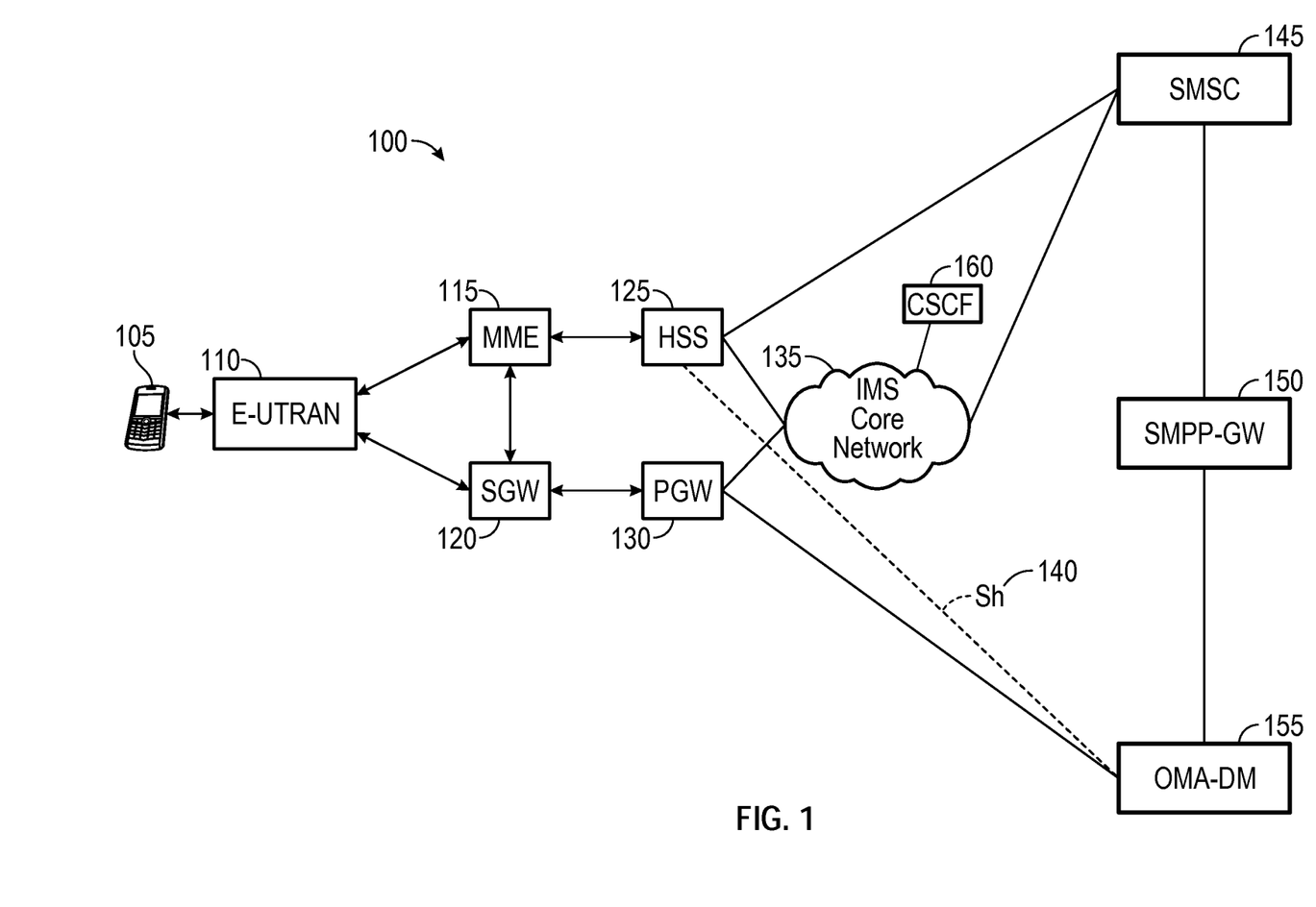
FIG. 1 illustrates an exemplary system in which a notification triggered device management session may be implemented.

FIG. 1 illustrates an exemplary system 100 in which a notification triggered device management session may be implemented. As shown, the system 100 includes a mobile station (MS) 105, an Evolved Universal Terrestrial Access Network (E-UTRAN) 110, a mobility management entity (MME) 115, a serving gateway (SGW) 120, a HSS 125, a packet data network gateway (PGW) 130, an Internet Protocol multimedia system (IPMS) core network 135, a short messaging service center (SMSC) 145, a short message peer-to-peer gateway (SMPP-GW) 150, an open mobile alliance device management (OMA-DM) server 155, and a call session control function (CSCF) 160.

According to some implementations, the OMA-DM 155 receives a request for a device management session for the MS 105. The request for the device management session for the MS 105 may be received from the MS 105 or from another device. The other device may be another end-user device (e.g., a laptop computer accessing a webpage for requesting the device management session) or a network device which periodically send requests for device management sessions when software update(s) are available. The OMA-DM 155 determines whether the MS 105 is connected to a cellular network by attempting, via the SMSC 145, to send a SMS message to the MS 105. The SMS message may instruct the MS 105 to initiate the device management session with the OMA-DM 155. The SMS message instructing the MS 105 may be an automatic process that does not require the user's interaction with the SMS program or further steps by the user to initiate the device management session. The MS 105 may receive the SMS message if the MS 105 is connected to a cellular network and may not receive the SMS message if the MS 105 is not connected to the cellular network.

If the MS 105 receives and responds to the SMS message, the device management session may be initiated. However, if the MS 105 does not respond to the SMS message within a threshold time period (e.g., 1 minute, 10 minutes, 1 hour, etc.), the OMA-DM 155 may signal the HSS 125 to update a user equipment (UE) profile of the MS 105, stored at the HSS 125, to indicate that the MS 105 has a pending device management session. In some implementations of the subject technology, a Sh interface connection 140 exists between the HSS 125 and the OMA-DM 155. The OMA-DM 155 may use the Sh interface to notify the HSS 125 of a pending device management sessions for the MS 105 and/or other mobile stations.

Upon connection of the MS 105 to a first network, which may be the E-UTRAN 110, and after the failure of the OMA-DM 155 to receive the response of the MS 105 to the SMS message, the CSCF 160 signals the MS 105 to connect to the OMA-DM 155 for the device management session, for example, via a SIP message. The MS 105 may connect to the OMA-DM 155 for the device management session using the first network.

As shown in FIG. 1, the HSS 125 is part of the IMS core network 135, which may be provided by a cellular operator, for example, Verizon Wireless®. The HSS 125 and the PGW 130 are part of the Evolved Packet Core (EPC) network according to the 3GPP specification. The SMSC 145 is a server that is connected to the IMS core network 135 but is not part of the IMS core network 135. The SMSC 145 is an application server that connects to the EPC network. The E-UTRAN 110 may be any network that allows the MS 105 to access the MME 115 and the SGW 120 in order to communicate via the Internet. For example, the E-UTRAN 110 may be a cellular network, a Wi-Fi network, a wired network, a wireless network, a dial-up network, etc. More details of the operations of the computing machines 105, 110, 115, 120, 125, 130, 145, 150, 155, and 160 illustrated in FIG. 1 are described in conjunction with FIGS. 2-5.

Figure 2:
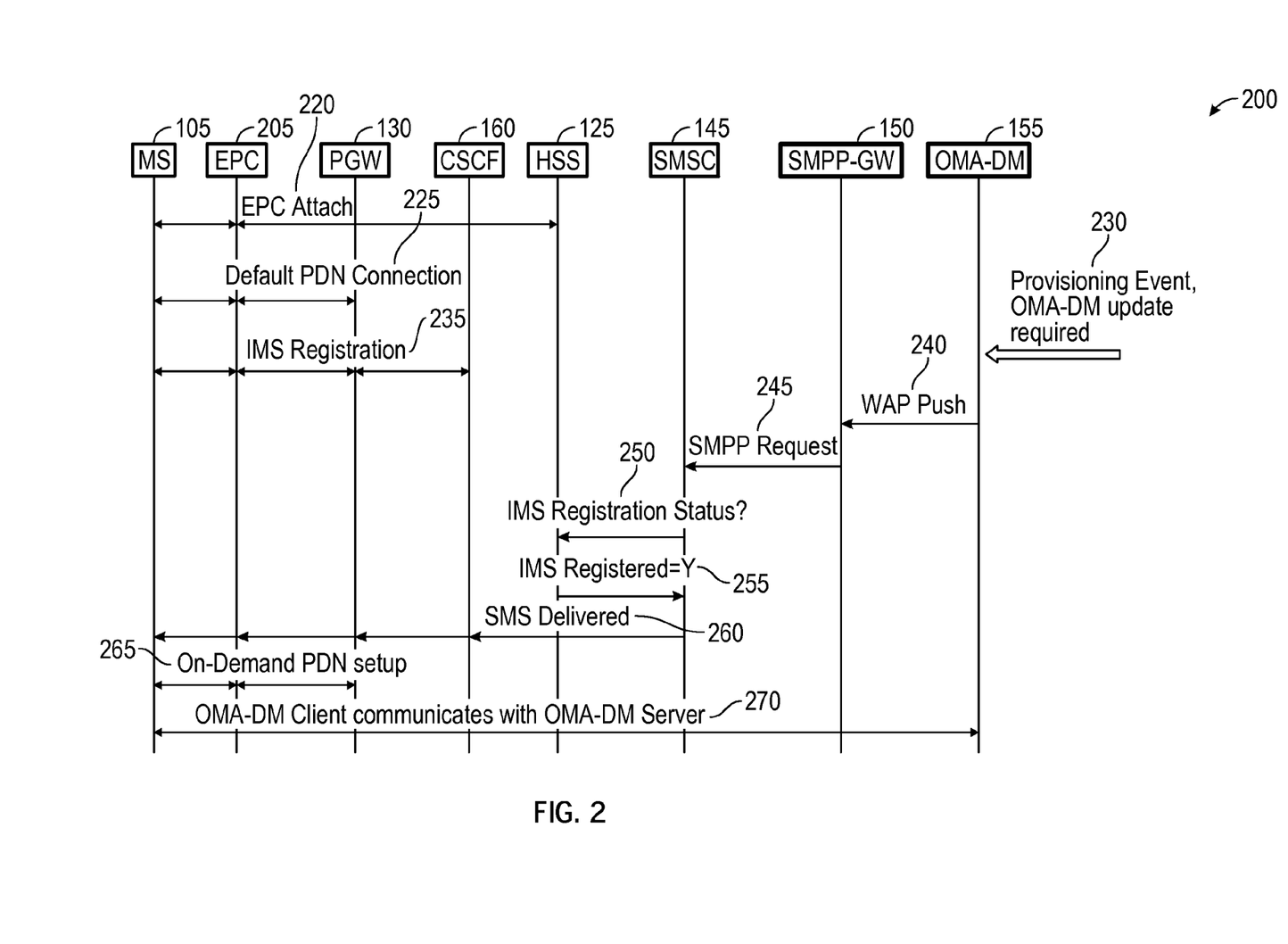
FIG. 2 is an exemplary data flow diagram for initiating a device management session using a wireless application protocol (WAP) push, where the mobile station is connected to the cellular network.

FIG. 2 is an exemplary data flow diagram 200 for initiating a device management session using a WAP push, where the mobile station is connected to the cellular network. In data flow diagram 200 data flows between the MS 105, evolved packet core (EPC) 205, PGW 130, CSCF 160, HSS 125, SMSC 145, SMPP-GW 150, and OMA-DM 155. The EPC 205 may be a packet network, such as a cellular network, a Wi-Fi network, a wired network, a wireless network, a dial-up network, etc., to which the MS 105 may connect. The CSCF 160 may be used to process SIP signaling packets in the IMS core network 135. The functions of the CSFC 160 described herein may be implemented at the HSS 125 or at other machine(s) connected to the IMS core network 135. In other words, the CSCF 160 may be implemented as a separate machine or as a component of the HSS 125.

As shown in FIG. 2, in step 220, the EPC 205 attaches to the MS 105 and the HSS 125. This allows the MS 105 to communicate in the IMS core network 135. In step 225, a default packet data network (PDN) connection is established between the MS 105 and the PGW 130, via the EPC 225, allowing the MS 105 to communicate using packets. In step 230, a provisioning event takes place and the OMA-DM 155 is notified that an update for the MS 105 is required. For example, the user of the MS 105 may request that the mobile operator's technical support repair or update the MS 105 remotely using the OMA-DM 155. In step 235, IMS registration takes place between the MS 105, the EPC 205, the PGW 130, and the CSCF 160, allowing each of the MS 105, the EPC 205, the PGW 130, and the CSCF 160 to communicate with one another in the IMS core network 135.

In step 240, the OMA-DM 155 provides a WAP push to the SMPP-GW 245 to initiate the device management session with the MS 105. In step 245, the SMPP-GW 245 responds by sending a SMPP request to the SMSC 145. In step 250, the SMSC 145 queries the HSS 124 for the IMS registration status of the MS 105. The IMS registration status may indicate whether the MS is connected to the IMS core network 135. In step 255, the HSS 125 notifies the SMSC 145 that the MS 105 is registered with the IMS core network 135. In step 260, an SMS message is delivered from the SMSC 145 to the MS 105 for initiating a device management session with the MS 105. In step 265, an on-demand PDN setup takes place between the MS 105 and the PGW 130. In step 270, the device management session is established and the OMA-DM client, the MS 105, communicates with the OMA-DM server 155 for the device management session.

Figure 3:
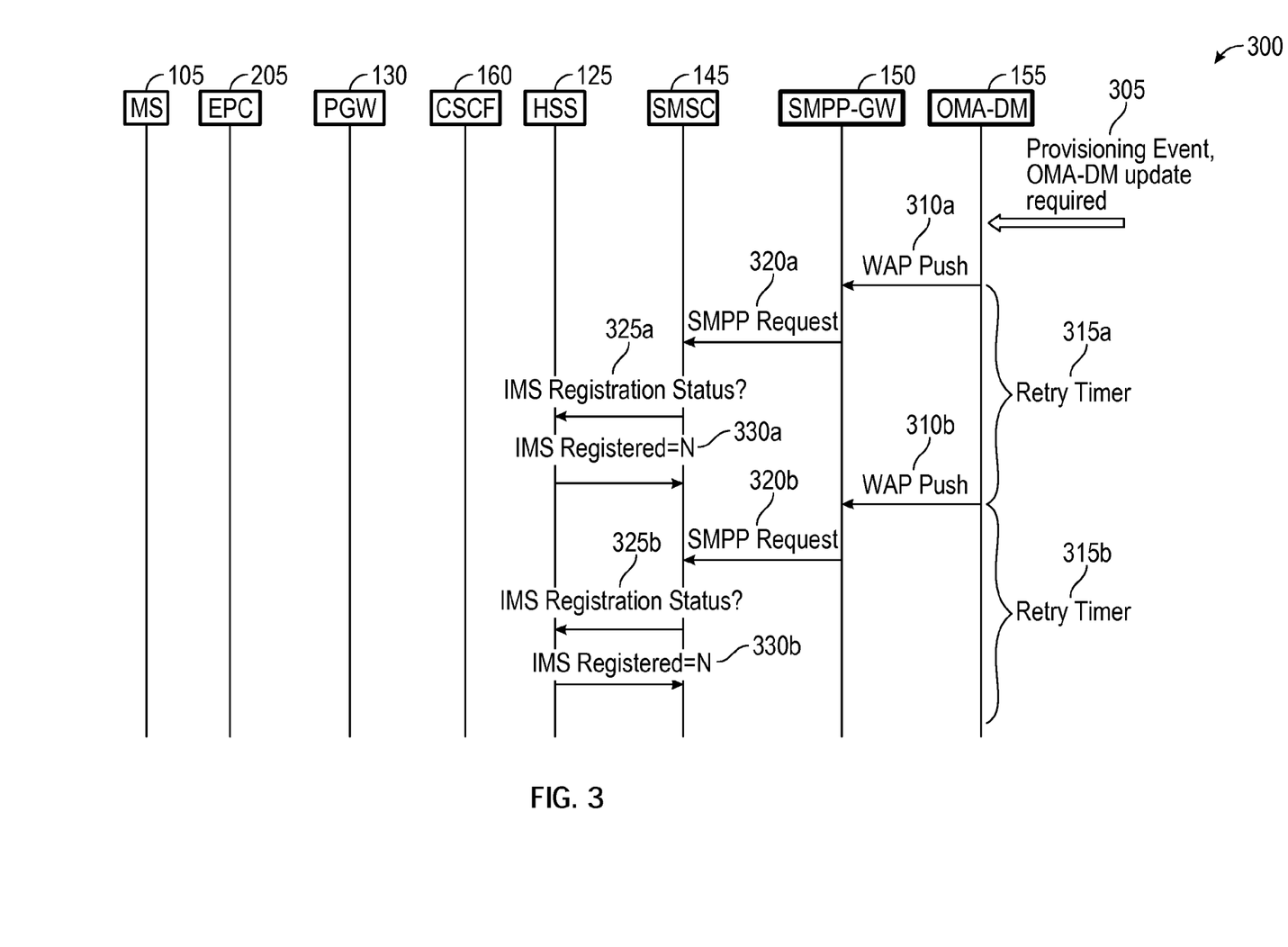
FIG. 3 is an exemplary data flow diagram for attempting to initiate a device management session using a WAP push, where the mobile station is disconnected from the cellular network.

FIG. 3 is an exemplary data flow diagram 300 for attempting to initiate a device management session using a WAP push, where the mobile station is disconnected from the cellular network. In step 305, the OMA-DM 155 receives a provisioning event, indicating that an update for the MS 105, completed using the OMA-DM 155, is required. For example, the user of the MS 105 may request that the mobile operator's technical support repair or update the MS 105 remotely using the OMA-DM 155. In step 310a, the OMA-DM 155 transmits a WAP push to the SMPP-GW 150 for transmitting an SMS message to the MS 105 to initiate the device management session. In step 315a, a retry timer is started to retry the transmission of the SMS message at a later time (e.g., after 1 minute, 10 minutes, 1 hour, etc.) if the current attempt to transmit the SMS message to the MS 105 is unsuccessful. The amount of time associated with the retry timer may be dependent on the network speed, the processing speed of the mobile station, the MS 105, the processing speed of the SMSC 145, the priority of the session or the number of previous retries. In step 320a, the SMPP-GW 150 sends a SMPP request to the SMSC 145 to transmit the SMS message to the MS 105. In step 325a, the SMSC 145 queries the IMS registration status of the MS 105 at the HSS 125. In step 330a, the SMSC 145 is notified that the SMSC 145 is not registered with the IMS. After the retry timer of step 315a completes, the steps 310a-330a are repeated as steps 310b-330b. The steps 310a-330a may be repeated until the MS 105 reconnects to the cellular network and registers with the IMS, allowing the MS 105 to receive the SMS message from the SMSC 145.

Figure 4:
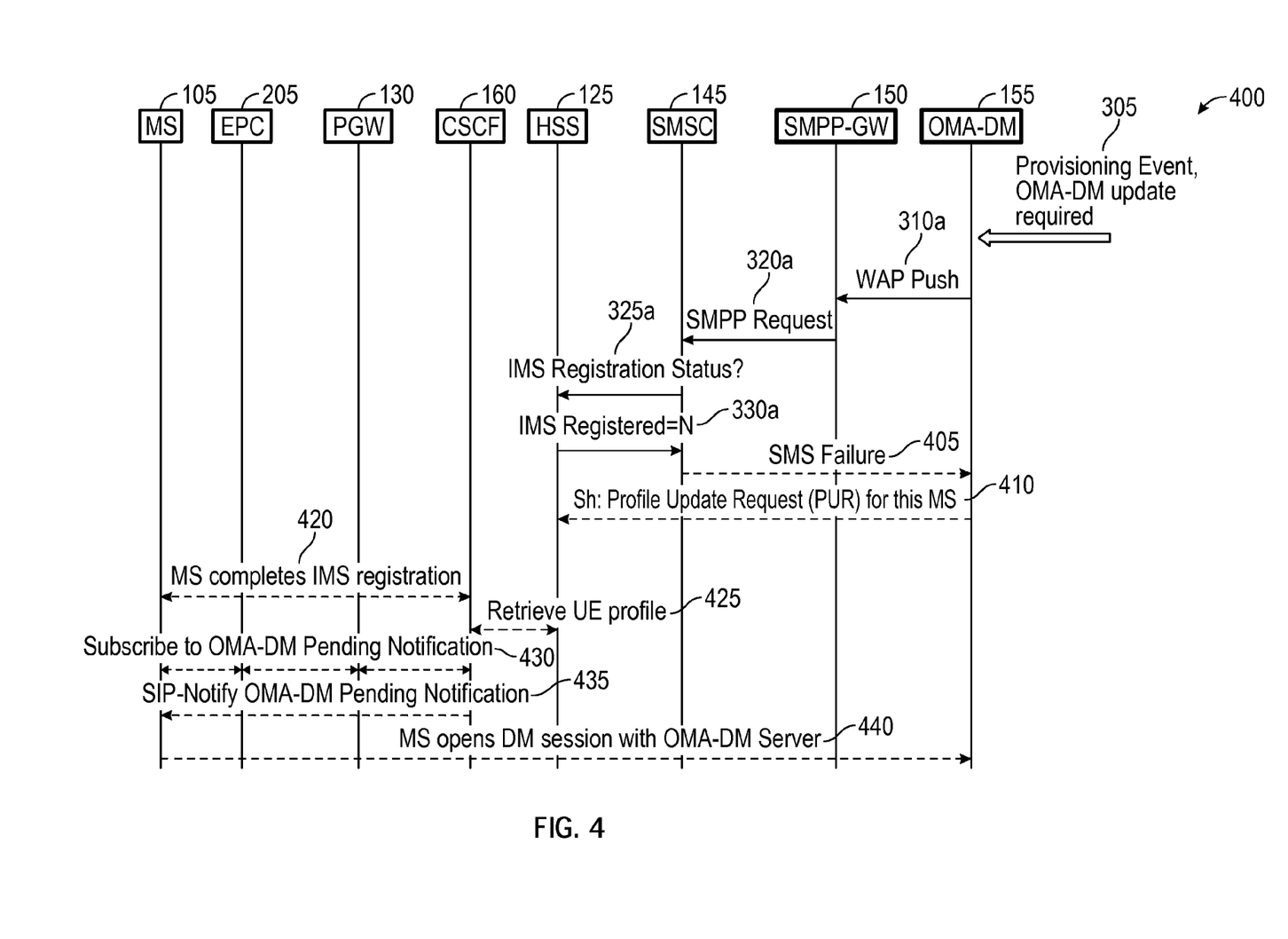
FIG. 4 is an exemplary data flow diagram for initiating a notification triggered device management session, where the mobile station is disconnected from the cellular network.

FIG. 4 is an exemplary data flow diagram 400 for initiating a notification triggered device management session, where the mobile station is disconnected from the cellular network. As shown, the steps 305, 310a, 320a, 325a, and 330a are repeated from FIG. 3. However, in some cases, a retry timer 315a may not be used or may be terminated after a predetermined number (e.g., 2 or 3) tries, where the predetermined number is determined by a programmer of the OMA-DM 155 or the SMSC 145, and the repeated steps 310b-330b may not be implemented. Instead, upon determining that the MS 105 is not registered with the IMS in step 330a, the process continues to step 405. In Step 405, the SMSC 145 notifies the OMA-DM 155 of inability of the SMSC 145 to transmit the SMS message to the MS 105. In step 410, the OMA-DM 155 transmits to the HSS 125 a profile update request (PUR) for the MS 105 over the Sh interface connection 140. The PUR causes the profile of the MS 105, stored by the HSS 125, to indicate that the MS 105 has a pending device management session. The HSS 125 updates the profile of the MS 105 accordingly. In step 420, the MS 105 reconnects to network (e.g., the E-UTRAN 110, which may be a cellular or Wi-Fi network) and completes IMS registration. Upon reconnection to the network, the MS 105 is notified via a SIP message transmitted from the CSCF 160 that there is a pending device management notification. The MS 105 may then initiate a device management client-initiated session with the OMA-DM 155 using an IP based connection, as described in detail below. In step 425, the UE profile for the MS 105 is retrieved from the CSCF 160 and provided to the HSS 125. In step 430, the UE 105, the EPC 205, the PGW 130, and the CSCF 160 subscribe to receive pending notifications for the MS 105, for example, a pending notification that the MS 105 has pending device management session. In step 435, the CSCF 160 notifies the MS 105 via a SIP message that it has a pending push notification from the OMA-DM 155. In step 440, the MS 105 opens the device management session with the OMA-DM 155 responsive to receiving the SIP message. The OMA-DM 155 may then initiate the device management session with the MS 105. The device management session may include providing updates to the MS 105, providing bug fixes to the MS 105, or troubleshooting the MS 105.

Figure 5:
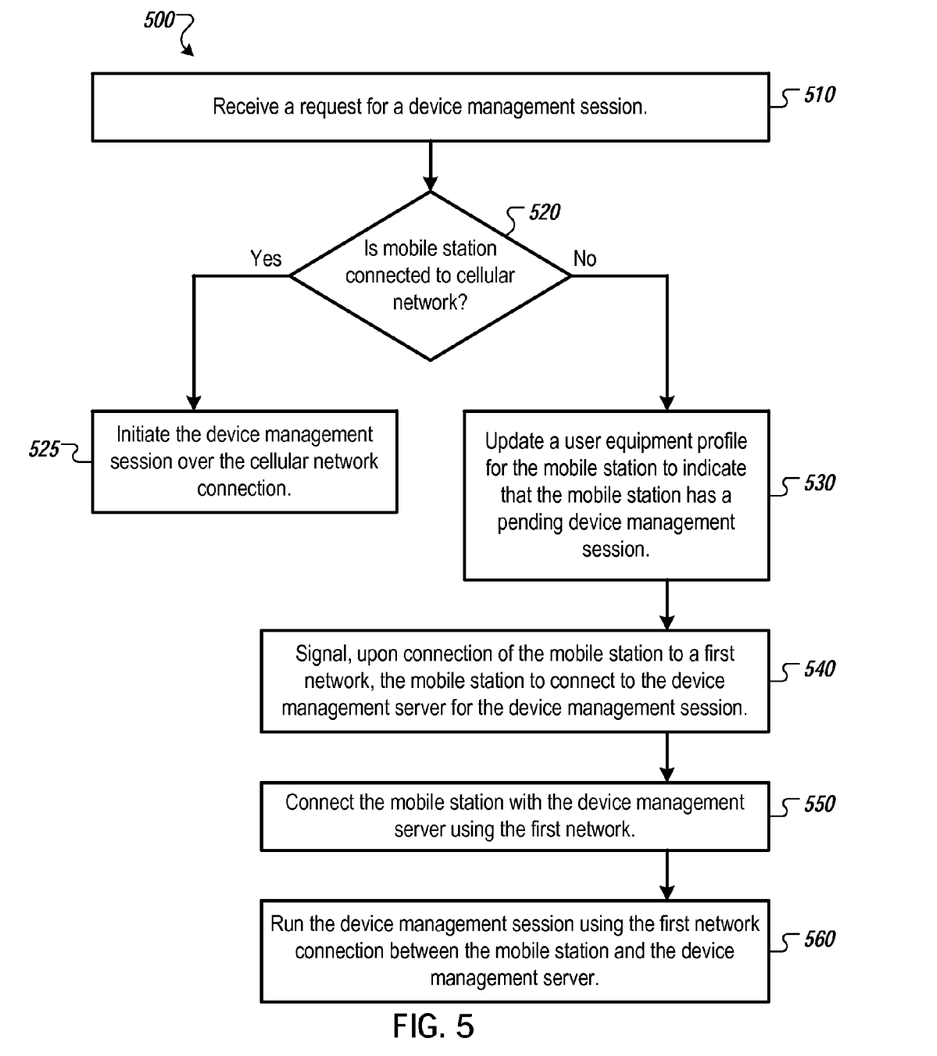
FIG. 5 is an exemplary flow chart illustrating an exemplary process for initiating a device management session.

FIG. 5 is an exemplary flow chart 500 illustrating an exemplary process for initiating a device management session. The process 500 begins at step 510, where a device management server (e.g., OMA-DM 155) receives a request for a device management session for a mobile station (e.g., MS 105). For example, a user of the mobile station may call a technical support center to report problems with the mobile station, and the technical support specialist may request the device management session for the mobile station.

In step 520, the device management server determines whether the mobile station is connected to a cellular network. For example, the device management server may signal a SMSC to send an SMS message to the mobile station for initiating the device management session. If the mobile station receives the SMS message and initiates the device management session within a threshold time period (e.g., 10 seconds, 2 minutes, 5 minutes, etc.), then the mobile station is connected to the cellular network. Otherwise, it is not. If the mobile station is connected to the cellular network, the process 500 continues to step 525. If the mobile station is not connected to the cellular network, the process 500 continues to step 530.

In step 525, if the mobile station is connected to the cellular network, the device management server initiates the device management session between the mobile station and the device management server over the cellular connection. For example, the mobile station may initiate the device management session in response to receiving the SMS message of step 520. After step 525, the process 500 ends.

In step 530, if the mobile station is not connected to the cellular network, the device management server signals a HSS to update a user equipment profile for the mobile station to indicate that the mobile station has pending device management session. The user equipment profile may be stored at the HSS and/or in a CSCF. The user equipment profile of the mobile station may be accessible, to the mobile station, when the mobile station is connected to a network, such as the cellular network or a Wi-Fi network.

In step 540, the HSS signals, upon connection of the mobile station to a first network, the mobile station to connect to the device management server for the device management session. The signaling is done using a SIP message from a CSCF. The mobile station is signaled to connect to the device management server based on the user equipment profile for the mobile station indicating that the mobile station has the pending device management session. In an alternative implementation, the device management server, or a single machine including both the HSS and the device management server, may signal the mobile station to connect to the device management server.

In step 550, the device management server and the mobile station connect using the first network connection of the mobile station. The mobile station may connect to the device management server using an IP connection over the first network. In step 560, the device management server runs the device management session with the mobile station using the first network connection of the mobile station. After step 560, the process 500 ends.

Figure 6:
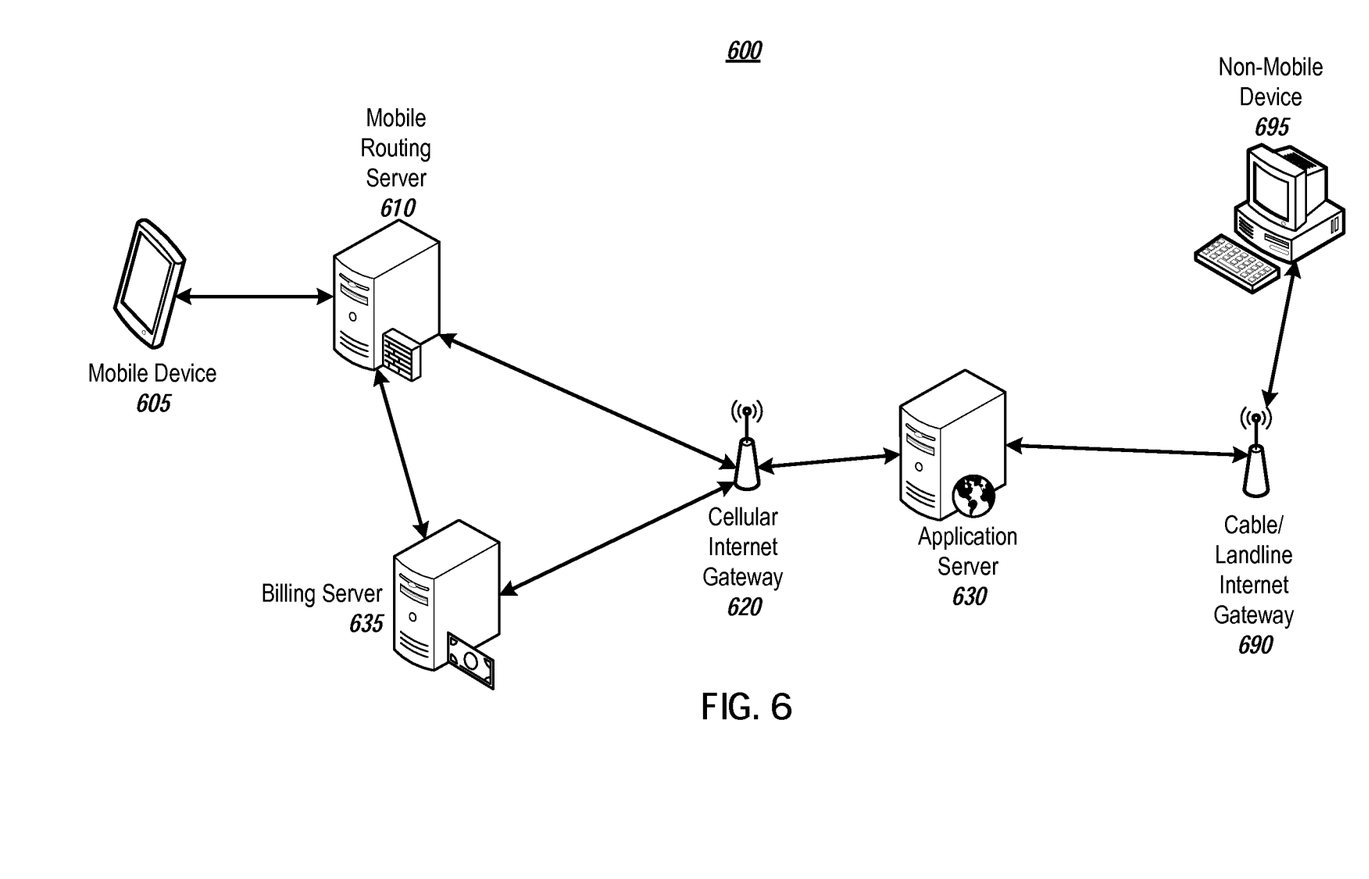
FIG. 6 is a high-level functional block diagram of an exemplary system of networks/devices that provide various communications for mobile stations, using which a notification triggered device management session may be implemented.

FIG. 6 illustrates an exemplary system 600 for providing data to a mobile device. The system 600 may be implemented in a cellular network, for example, a 4G or Long Term Evolution (LTE) network. As shown, the system 600 includes a mobile device 605, a mobile routing server 610, a cellular Internet gateway 620, an application server 630, a billing server 635, a cellular/landline Internet gateway 690, and a non-mobile device 695. The MS 105 may correspond to the mobile device 605. The MME 115, SGW 120, HSS 125, PGW 130, SMSC 145, SMPP-GW 150, or OMA-DM 155 may correspond to the application server 630.

The cellular Internet gateway 620 may correspond to a cellular access point name (APN) supporting data network traffic that may be charged to the user of the mobile device 605. The cable/landline Internet gateway 690 may correspond to a cable/landline APN. As used herein, the phrase "Internet gateway" may refer to a gateway through which a user accesses data and through which a billing server 635 may be notified of the user's data access in order to charge the user's account. In some cases, the gateways 620 and/or 690 are APNs.

Figure 7:
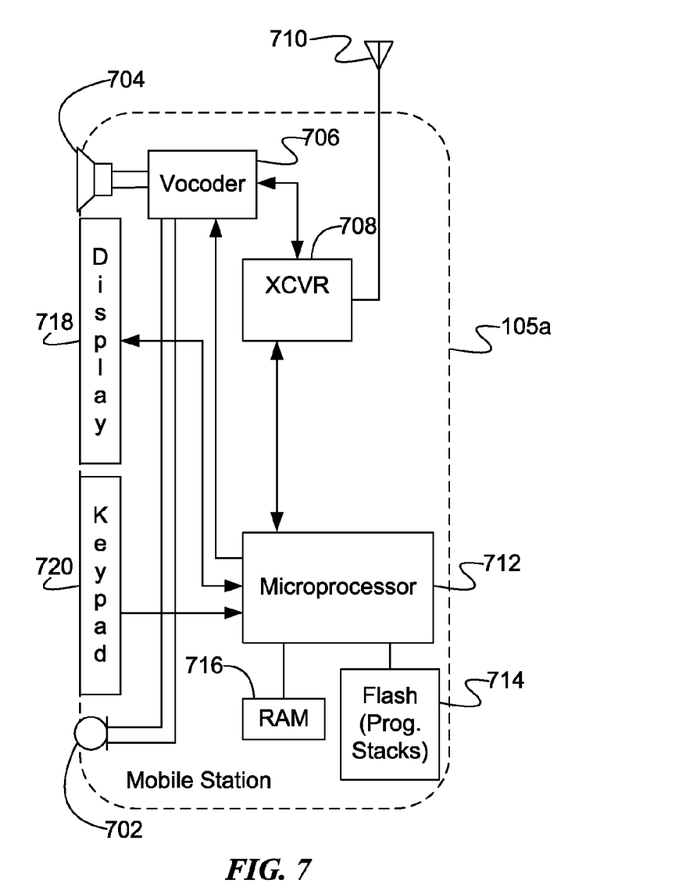
FIG. 7 is a high-level functional block diagram of an exemplary non-touch type mobile station which may be involved in a notification triggered device management session.
Figure 8:
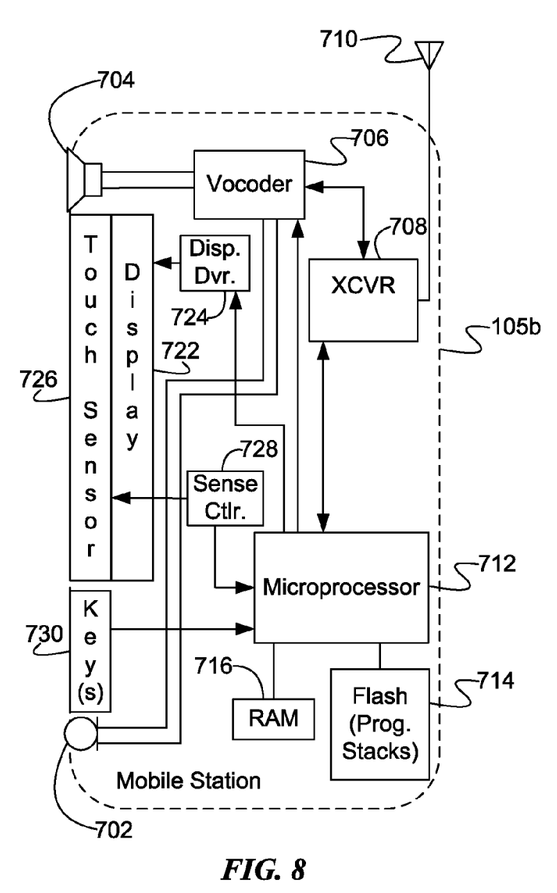
FIG. 8 is a high-level functional block diagram of an exemplary touch screen type mobile station which may be involved in a notification triggered device management session.

The mobile device 605 may be any mobile device capable of accessing a mobile network, for example, a mobile phone, a tablet computer, or a laptop or desktop computer including an internal or external mobile network interface. Examples of the mobile device 605 are illustrated in FIG. 7 and FIG. 8. The mobile routing server 610 and the billing server 635 are associated with a mobile operator that controls the gateway 620. The application server 630 stores web content or application(s), which may be accessed via the mobile device 605 or via the non-mobile device 695. The web content may include webpage(s) or page(s) within applications.

According to some implementations, the mobile routing server 610 receives, from the mobile device 605, a request to access web content. For example, the request may be a request to view a webpage associated with a uniform resource locator (URL), such as www.example.com, using a browser of the mobile device 605 or to run an application, for example, an online banking application for accessing data stored at an application server 630 associated with a bank. The mobile routing server 610 may provide the data from the application server 630 to the mobile device 605 via the cellular Internet gateway 620. The mobile routing server 610 may notify the billing server 635 of the amount of data accessed (e.g., 10 kilobytes) so that the user's account may be charged accordingly.

The mobile routing server 610 may measure the amount of data associated with the cellular Internet gateway 620 and forward this information to the billing server 135. Alternatively, the amount of data accessed may be measured at the cellular Internet gateway 620, and forwarded from the gateway 620 to the billing server 635. The billing server 635 may then charge the account associated with the content provider or the account associated with the user of the mobile device for the access to the web content based on the measured amount of data accessed.

A user of the non-mobile device 695 may access the content of the application server 630 using a cable or landline connection to the cable/landline Internet gateway 690. In some cases, as shown, the cable or landline connection may provide for unlimited data access and, thus, the cable or landline company may not need a billing server. Alternatively, a billing server may be associated with the cable/landline Internet gateway 690.

The subject technology may be implemented in conjunction with touch screen type mobile stations as well as to non-touch type mobile stations. Hence, our simple example shows the mobile station (MS) 105a as a non-touch type mobile station and shows the mobile station (MS) 105b as a touch screen type mobile station. Some implementation may involve at least some execution of programming in the mobile stations as well as implementation of user input/output functions and data communications through the network systems 100 and 600, from the mobile stations. Those skilled in the art presumably are familiar with the structure, programming and operations of the various types of mobile stations. However, for the sake of completeness two types of mobile stations are described below with respect to FIGS. 7 and 8.

As shown by the above discussion, functions relating to MMS communication may be implemented on computers connected for data communication via the components of a packet data network, as shown in FIG. 6. For example, the mobile station 105 may correspond to mobile device 605. The MME 115, SGW 120, HSS 125, PGW 130, SMSC 145, SMPP-GW 150, or OMA-DM 155 may correspond to the application server 630. Although special purpose devices may be used, such devices also may be implemented using one or more hardware platforms intended to represent a general class of data processing device commonly used to run "server" programming so as to implement the functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data. In operation, the code is stored within the general-purpose computer platform. At other times, however, the software may be stored at other locations and/or transported for loading into the appropriate general-purpose computer system. Execution of such code by a processor of the computer platform enables the platform to implement the methodology described herein.

The mobile stations of FIGS. 7 and 8 may correspond to the mobile station 105. FIG. 7 illustrates exemplary non-touch type mobile station. FIG. 8 illustrates an exemplary touch screen type mobile station.

As shown by the above discussion, functions relating to MMS communication may be implemented on computers connected for data communication via the components of a packet data network, as shown in FIG. 6. For example, the mobile station 105 may correspond to the mobile station 105a or the mobile station 105b. Although special purpose devices may be used, such devices also may be implemented using one or more hardware platforms intended to represent a general class of data processing device commonly used to run "server" programming so as to implement the functions discussed above, albeit with an appropriate network connection for data communication.

FIG. 7 provides a block diagram illustration of an exemplary non-touch type mobile station 105a, which may correspond to the mobile station 105. Although the mobile station 105b may be a smart-phone or may be incorporated into another device, such as a personal digital assistant (PDA) or the like, for discussion purposes, the illustration shows the mobile station 105a is in the form of a handset. The handset embodiment of the mobile station 105a functions as a normal digital wireless telephone station. For that function, the mobile station 105a includes a microphone 702 for audio signal input and a speaker 704 for audio signal output. The microphone 702 and speaker 704 connect to voice coding and decoding circuitry (vocoder) 706. For a voice telephone call, for example, the vocoder 706 provides two-way conversion between analog audio signals representing speech or other audio and digital samples at a compressed bit rate compatible with the digital protocol of wireless telephone network communications or voice over packet (Internet Protocol) communications.

For digital wireless communications, the mobile station 105a also includes at least one digital transceiver (XCVR) 708. The mobile station 105a may be configured for digital wireless communications using one or more of the common network technology types. The concepts discussed here encompass embodiments of the mobile station utilizing any digital transceivers that conform to current or future developed digital wireless communication standards. The mobile station may also be capable of analog operation via a legacy network technology.

The transceiver 708 provides two-way wireless communication of information, such as vocoded speech samples and/or digital information, in accordance with the technology of the network 165. The transceiver 708 also sends and receives a variety of signaling messages in support of the various voice and data services provided via the mobile station 105a and the communication network. Each transceiver 708 connects through RF send and receive amplifiers (not separately shown) to an antenna 710. The transceiver may also support various types of mobile messaging services, such as short message service (SMS), enhanced messaging service (EMS) and/or multimedia messaging service (MMS).

The mobile station 105a includes a display 718 for displaying messages, menus or the like, call related information dialed by the user, calling party numbers, etc. A keypad 720 enables dialing digits for voice and/or data calls as well as generating selection inputs, for example, as may be keyed-in by the user based on a displayed menu or as a cursor control and selection of a highlighted item on a displayed screen. The display 718 and keypad 720 are the physical elements providing a textual or graphical user interface. Various combinations of the keypad 720, display 718, microphone 702 and speaker 704 may be used as the physical input output elements of the graphical user interface (GUI), for multimedia (e.g., audio and/or video) communications. Of course other user interface elements may be used, such as a trackball, as in some types of PDAs or smart phones.

In addition to normal telephone and data communication related input/output (including message input and message display functions), the user interface elements also may be used for display of menus and other information to the user and user input of selections.

A microprocessor 712 serves as a programmable controller for the mobile station 105a, in that it controls all operations of the mobile station 105a in accordance with programming that it executes, for all normal operations, including those under consideration here. In the example, the mobile station 105a includes flash type program memory 714, for storage of various "software" or "firmware" program routines and mobile configuration settings, such as mobile directory number (MDN) and/or mobile identification number (MIN), etc. The flash type program memory 714 stores programmed instructions, including those described herein. The mobile station 105a may include a non-volatile random access memory (RAM) 716 for a working data processing memory. Of course, other storage devices or configurations may be added to or substituted for those in the example. In a present implementation, the flash type program memory 714 stores firmware such as a boot routine, device driver software, an operating system, call processing software and vocoder control software, and any of a wide variety of other applications, such as client browser software and short message service software. The memories 714, 716 also store various data, such as telephone numbers and server addresses, downloaded data such as multimedia content, and various data input by the user. Programming stored in the flash type program memory 714, sometimes referred to as "firmware," is loaded into and executed by the microprocessor 712.

As outlined above, the mobile station 105*a* includes a processor, and programming stored in the flash memory 714 configures the processor so that the mobile station is capable of performing various desired functions, including those described herein.

For purposes of such a discussion, FIG. 8 provides a block diagram illustration of an exemplary touch screen type mobile station 105*b*. Although possible configured somewhat differently, at least logically, a number of the elements of the exemplary touch screen type mobile station 105*b* are similar to the elements of mobile station 105*a*, and are identified by like reference numbers in FIG. 8. For example, the touch screen type mobile station 105*b* includes a microphone 702, speaker 704 and vocoder 706, for audio input and output functions, much like in the earlier example. The mobile station 105*b* also includes at least one digital transceiver (XCVR) 708, for digital wireless communications, although the mobile station 105*b* may include an additional digital or analog transceiver. The concepts discussed here encompass embodiments of the mobile station 105*b* utilizing any digital transceivers that conform to current or future developed digital wireless communication standards. As in the mobile station 105*a*, the transceiver 708 provides two-way wireless communication of information, such as vocoded speech samples and/or digital information, in accordance with the technology of the network 165. The transceiver 708 also sends and receives a variety of signaling messages in support of the various voice and data services provided via the mobile station 105*b* and the network 165. Each transceiver 708 connects through RF send and receive amplifiers (not separately shown) to an antenna 710. The transceiver may also support various types of mobile messaging services, such as short message service (SMS), enhanced messaging service (EMS) and/or multimedia messaging service (MMS).

As in the example of the mobile station 105*a*, a microprocessor 712 serves as a programmable controller for the mobile station 105*b*, in that it controls all operations of the mobile station 105*b* in accordance with programming that it executes, for all normal operations, and for operations described herein. In the example, the mobile station 105*b* includes flash type program memory 714, for storage of various program routines and mobile configuration settings. The mobile station 105*b* may also include a non-volatile random access memory (RAM) 716 for a working data processing memory. Of course, other storage devices or configurations may be added to or substituted for those in the example. Hence, outlined above, the mobile station 105*b* includes a processor, and programming stored in the flash memory 714 configures the processor so that the mobile station is capable of performing various desired functions, including the functions described herein.

In the example of FIG. 8, the user interface elements included a display and a keypad. The mobile station 105*b* may have a limited number of key(s) 730, but the user interface functions of the display and keypad are replaced by a touchscreen display arrangement. At a high level, a touchscreen display is a device that displays information to a user and can detect occurrence and location of a touch on the area of the display. The touch may be an actual touch of the display device with a finger, stylus or other object, although at least some touchscreens can also sense when the object is in close proximity to the screen. Use of a touchscreen display as part of the user interface enables a user to interact directly with the information presented on the display.

Hence, the exemplary mobile station 105*b* includes a display 722, which the microprocessor 712 controls via a display driver 724, to present visible outputs to the device user. The mobile station 105*b* also includes a touch/position sensor 726. The sensor 726 is relatively transparent, so that the user may view the information presented on the display 722. A sense circuit 728 sensing signals from elements of the touch/position sensor 726 and detects occurrence and position of each touch of the screen formed by the display 722 and sensor 726. The sense circuit 728 provides touch position information to the microprocessor 712, which can correlate that information to the information currently displayed via the display 722, to determine the nature of user input via the screen.

The display 722 and touch sensor 726 (and possibly one or more keys 730, if included) are the physical elements providing the textual and graphical user interface for the mobile station 105*b*. The microphone 702 and speaker 704 may be used as user interface elements for audio input and output.

The structure and operation of the mobile stations 105*a* and 105*b*, as outlined above, were described to by way of example, only.

Figures 9, 10:
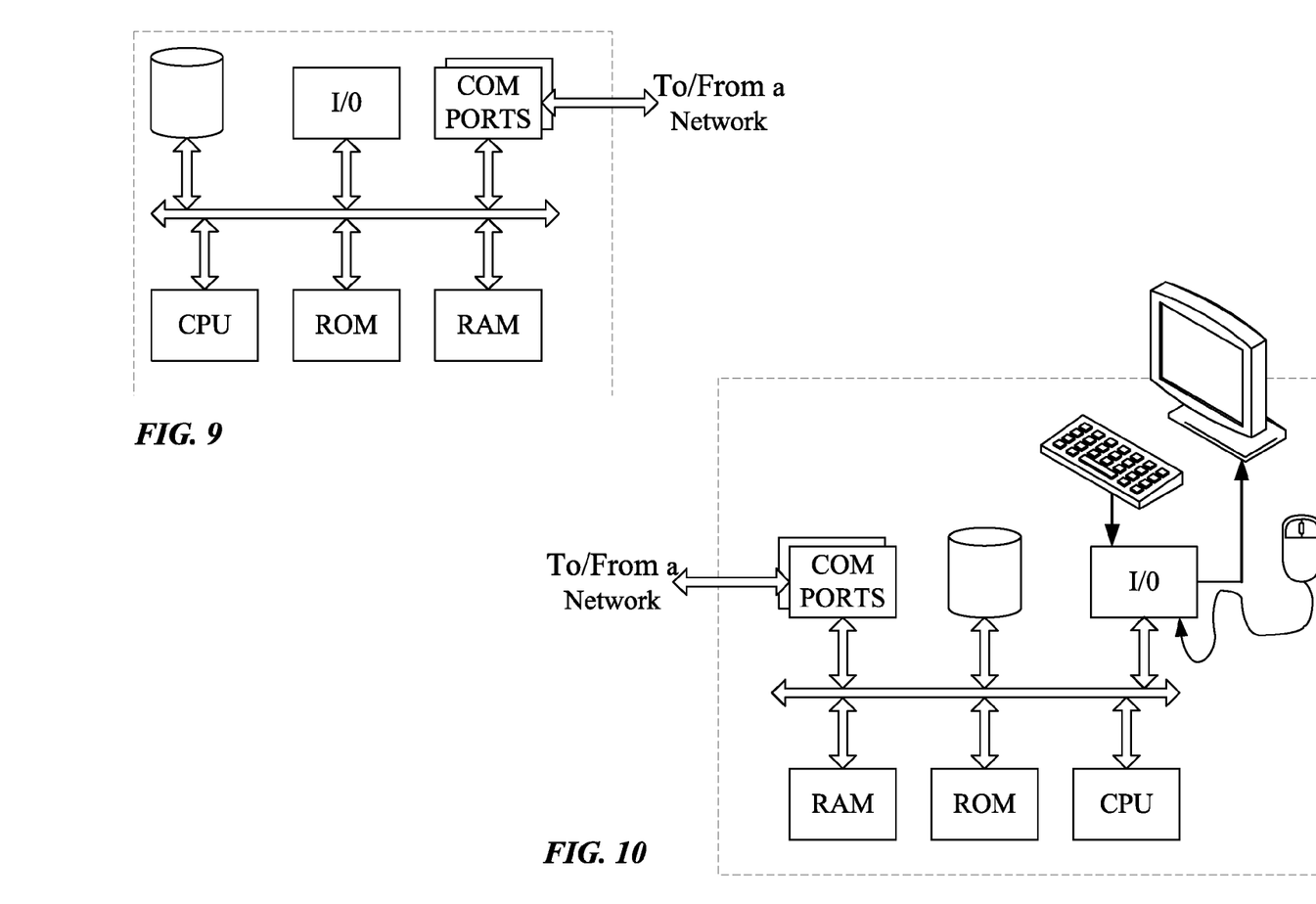
FIG. 9 is a simplified functional block diagram of a computer that may be configured to function a server computing device.
FIG. 10 is a simplified functional block diagram of a personal computer or other work station or terminal device, which may be configured to function as the server computing device.

FIGS. 9 and 10 provide functional block diagram illustrations of general purpose computer hardware platforms. FIG. 9 illustrates a network or host computer platform, as may typically be used to implement a server. FIG. 10 depicts a computer with user interface elements, as may be used to implement a personal computer or other type of work station or terminal device, although the computer of FIG. 10 may also act as a server if appropriately programmed. It is believed that the general structure and general operation of such equipment as shown in FIGS. 9 and 10 should be self-explanatory from the high-level illustrations.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIGS. 9 and 10). A mobile station type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, examples of the methods of determining an action plan with respect to a returned device outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a Blu-ray disc read-only memory (BD-ROM), CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

These general and specific aspects may be implemented using a system, a method, a computer program, a computer readable medium, or an apparatus or any combination of systems, methods, computer programs, computer readable mediums, and/or apparatuses.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and may be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, should may they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
receiving, at a device management server from a user of a mobile station that is disconnected from a cellular network, a request for a device management session for the mobile station to troubleshoot a problem with the mobile station experienced by the user, the request received from the user via a device other than the mobile station;
in response to receiving the request for the device management session for the mobile station, determining that the mobile station is disconnected from the cellular network by:
transmitting, to the mobile station via the cellular network, a message instructing the mobile station to initiate the device management session, and
determining that, after a threshold time period, the mobile station has not initiated the device management session in response to receiving the transmitted message;
in response to determining that the mobile station is disconnected from the cellular network, signaling a home subscriber server (HSS) to update a user equipment profile for the mobile station to indicate that the mobile station has a pending device management session;
upon connection of the mobile station to a first network distinct from the cellular network and while the mobile station remains disconnected from the cellular network, signaling, using a call session control function (CSCF) and based on the updated user equipment profile for the mobile station indicating that the mobile station has the pending device management session, the mobile station to connect to the device management server for the device management session over the first network distinct from the cellular network;
after signaling the mobile station to connect to the device management server over the first network and while the mobile station remains disconnected from the cellular network, receiving, at the device management server, an indication of a connection between the mobile station and the device management server, the connection provided by way of the first network; and
in response to receiving the indication of the connection between the mobile station and the device management server and while the mobile station remains disconnected from the cellular network, running the device management session over the first network distinct from the cellular network by way of the connection between the mobile station and the device management server.

2. The method of claim 1, wherein the device management session comprises one or more of: a software update, a connectivity settings or cellular provider settings update, or a diagnostic session.

3. The method of claim 1, wherein the first network distinct from the cellular network comprises a Wi-Fi network.

4. The method of claim 1, wherein the first network distinct from the cellular network comprises a wired network.

5. The method of claim 1, wherein the first network connection between the mobile station and the device management server comprises an Internet Protocol (IP) connection.

6. The method of claim 1, wherein signaling the mobile station to connect to the device management server for the device management session comprises signaling, using a session initiation protocol (SIP) message from the CSCF, the mobile station to connect to the device management server.

7. The method of claim 1, wherein determining that the mobile station is disconnected from the cellular network further comprises:
failing to receive, within the threshold time period, a response from the mobile station to the message instructing the mobile station to initiate the device management session.

8. The method of claim 1, wherein the message instructing the mobile station to initiate the device management session and transmitted via the cellular network comprises a wireless application protocol (WAP) push or a short messaging service (SMS) message.

9. The method of claim 1, wherein the mobile station is signaled to connect to the device management server in real-time after the HSS updates the user equipment profile for the mobile station to indicate that the mobile station has the pending device management session.

10. The method of claim 1, wherein the mobile station is signaled to connect to the device management server at least a delay time period after the HSS updates the user equipment profile for the mobile station to indicate that the mobile station has the pending device management session.

11. A non-transitory computer-readable medium comprising instructions which, when executed by one or more computers, cause the one or more computers to:
receive, at a device management server from a user of a mobile station that is disconnected from a cellular network, a request for a device management session for the mobile station to troubleshoot a problem with the mobile station experienced by the user, the request received from the user via a device other than the mobile station;
in response to receiving the request for the device management session for the mobile station, determine that the mobile station is disconnected from the cellular network by:
transmitting, to the mobile station via the cellular network, a message instructing the mobile station to initiate the device management session, and
determining that, after a threshold time period, the mobile station has not initiated the device management session in response to receiving the transmitted message;
in response to determining that the mobile station is disconnected from the cellular network, signal a home subscriber server (HSS) to update a user equipment profile for the mobile station to indicate that the mobile station has a pending device management session;
upon connection of the mobile station to a first network distinct from the cellular network and while the mobile station remains disconnected from the cellular network, signal, using a call session control function (CSCF) and based on the updated user equipment profile for the mobile station indicating that the mobile station has the pending device management session, the mobile station to connect to the device management server for the device management session over the first network distinct from the cellular network;
after signaling the mobile station to connect to the device management server over the first network and while the mobile station remains disconnected from the cellular network, receive, at the device management server, an indication of a connection between the mobile station and the device management server, the connection provided by way of the first network; and in response to receiving the indication of the connection between the mobile station and the device management server and while the mobile station remains disconnected from the cellular network, run the device management session over the first network distinct from the cellular network by way of the connection between the mobile station and the device management server.

12. The computer-readable medium of claim 11, wherein the device management session comprises one or more of: a software update, a connectivity settings or cellular provider settings update, or a diagnostic session.

13. The computer-readable medium of claim 11, wherein the first network distinct from the cellular network comprises a Wi-Fi network.

14. The computer-readable medium of claim 11, wherein the first network distinct from the cellular network comprises a wired network.

15. The computer-readable medium of claim 11, wherein the first network connection between the mobile station and the device management server comprises an Internet Protocol (IP) connection.

16. A system comprising:
a processor; and
a memory storing instructions which, when executed by the processor, cause the processor to:
  receive, at a device management server from a user of a mobile station that is disconnected from a cellular network, a request for a device management session for the mobile station to troubleshoot a problem with the mobile station experienced by the user, the request received from the user via a device other than the mobile station;
  in response to receiving the request for the device management session for the mobile station, determine that the mobile station is disconnected from the cellular network by:
    transmitting, to the mobile station via the cellular network, a message instructing the mobile station to initiate the device management session, and
    determining that, after a threshold time period, the mobile station has not initiated the device management session in response to receiving the transmitted message;
  in response to determining that the mobile station is disconnected from the cellular network, signal a home subscriber server (HSS) to update a user equipment profile for the mobile station to indicate that the mobile station has a pending device management session;
  upon connection of the mobile station to a first network distinct from the cellular network and while the mobile station remains disconnected from the cellular network, signal, using a call session control function (CSCF) and based on the updated user equipment profile for the mobile station indicating that the mobile station has the pending device management session, the mobile station to connect to the device management server for the device management session over the first network distinct from the cellular network;
  after signaling the mobile station to connect to the device management server over the first network and while the mobile station remains disconnected from the cellular network, receive, at the device management server, an indication of a connection between the mobile station and the device management server, the connection provided by way of the first network; and
  in response to receiving the indication of the connection between the mobile station and the device management server and while the mobile station remains disconnected from the cellular network, run the device management session over the first network distinct from the cellular network by way of the connection between the mobile station and the device management server.

17. The system of claim 16, wherein the device management session comprises one or more of: a software update, a connectivity settings or cellular provider settings update, or a diagnostic session.

18. The system of claim 16, wherein the first network distinct from the cellular network comprises a Wi-Fi network.

19. The system of claim 16, wherein the first network distinct from the cellular network comprises a wired network.

20. The system of claim 16, wherein the first network connection between the mobile station and the device management server comprises an Internet Protocol (IP) connection.

* * * * *